United States Patent
Ichigaya et al.

(10) Patent No.: US 9,485,513 B2
(45) Date of Patent: Nov. 1, 2016

(54) ENCODING DEVICE, DECODING DEVICE, AND PROGRAM

(71) Applicant: NIPPON HOSO KYOKAI, Shibuya-ku, Tokyo (JP)

(72) Inventors: Atsuro Ichigaya, Tokyo (JP); Yoshiaki Shishikui, Tokyo (JP); Shinichi Sakaida, Tokyo (JP); Kazuhisa Iguchi, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 115 days.

(21) Appl. No.: 14/566,347

(22) Filed: Dec. 10, 2014

(65) Prior Publication Data

US 2015/0245041 A1 Aug. 27, 2015

Related U.S. Application Data

(63) Continuation of application No. PCT/JP2012/003781, filed on Jun. 11, 2012.

(51) Int. Cl.
*H04N 7/12* (2006.01)
*H04N 19/186* (2014.01)
(Continued)

(52) U.S. Cl.
CPC .......... *H04N 19/186* (2014.11); *H04N 19/105* (2014.11); *H04N 19/44* (2014.11); *H04N 19/513* (2014.11); *H04N 19/89* (2014.11)

(58) Field of Classification Search
CPC .. H04N 19/186; H04N 19/513; H04N 19/89; H04N 19/44; H04N 19/105
USPC ...................................... 375/240.02
See application file for complete search history.

(56) References Cited

U.S. PATENT DOCUMENTS

2001/0053186 A1* 12/2001 Nakaya ................. H04N 19/52
375/240.25
2009/0257492 A1 10/2009 Andersson et al.
2012/0195380 A1* 8/2012 Wang ................. H04N 19/105
375/240.12

FOREIGN PATENT DOCUMENTS

JP 7-212761 A 8/1995
JP 2005-184241 A 7/2005
(Continued)

OTHER PUBLICATIONS

Notification of Reason(s) for Refusal, and English language translation thereof, in corresponding Japanese Application No. 2014-062176, dated May 19, 2015, 7 pages.
(Continued)

*Primary Examiner* — Allen Wong
(74) *Attorney, Agent, or Firm* — Brinks Gilson & Lione

(57) ABSTRACT

In the present invention, at least two component signals that represent luminance and a color difference in an original signal having a predetermined image format are encoded/decoded. This encoding device (10) is equipped with: a local decoding section (17-1, 17-2, 18-1, 18-2, 23-1, 23-2) that generates a locally decoded signal of a second component signal; a luminance-color difference prediction unit (4) that generates a parameter for normalizing the second component signal by comparing the original signal of a first component signal not yet encoded with the locally decoded signal of the second component signal in order to generate a luminance-color difference prediction signal; a prediction signal generation unit (22-1) that generates a prediction signal for an intra-screen prediction or a prediction signal for an inter-screen prediction regarding the first component signal; a synthesis unit (2) that performs a weighted addition of the prediction signal and the luminance-color difference prediction signal in order to generate a corrected prediction signal for the first component signal; and an encoding section (13-1, 14-1, 15-1, 16-1) that generates and encodes a difference signal between the corrected prediction signal and the original signal of the first component signal.

6 Claims, 9 Drawing Sheets

(51) Int. Cl.
H04N 19/105 (2014.01)
H04N 19/44 (2014.01)
H04N 19/513 (2014.01)
H04N 19/89 (2014.01)

(56) References Cited

FOREIGN PATENT DOCUMENTS

| | | |
|---|---|---|
| JP | 2008-306719 A | 12/2008 |
| JP | 2009-005280 A | 1/2009 |
| JP | 2009-71827 A | 4/2009 |
| JP | 2011-193363 A | 9/2011 |
| JP | 2011-229013 A | 11/2011 |

OTHER PUBLICATIONS

Kuno, Tetsuya et al., "Interpolation Revisited to Digital Cameras," *The Journal of the Institute of Image Information and Television Engineers,* vol. 61, No. 7, Jul. 1, 2007, pp. 1006-1016, with English language abstract.

Sugita, Hiroshi et al., "Chrominance Signal Interpolation of YUV4:2:0 Format Color Images," *The Institute of Electronics, Information and Communication Engineers Transactions,* vol. J88-A, No. 6, Jun. 1, 2005, pp. 751-760.

International Search Report, and English language translation thereof, in corresponding International Application No. PCT/JP2012/003781, dated Mar. 12, 2013, 3 pages.

Lee, Sang Heon et al., "Intra Prediction Method Based on the Linear Relationship Between the Channels for YUV 4:2:0 Intra Coding," *Image Processing(ICIP),* 2009 16th IEEE International Conference on Image Processing (ICIP 2009), Nov. 10, 2009, pp. 1037-1040, Obtained from URL <http://ieeexplore.ieee.org/stamp/stamp.jsp?tp=&arnumber=5413727>.

Notification of Reason(s) for Refusal, and English language translation thereof, in corresponding Japanese Application No. 2014-062176, dated Jan. 6, 2015, 8 pages.

Benierbah, S. et al., "Compression of Colour Images by Inter-Band Compensated Prediction", *IEE Proceedings: Vision, Image and Signal Processing,* Institution of Electrical Engineers, vol. 153, No. 2, Apr. 2006, pp. 237-243.

Extended Search Report in corresponding European Application No. 12878697.7, dated Jan. 20, 2016, 11 pages.

Office Action, and English language translation thereof, in corresponding Korean Application No. 10-2015-7000438, dated Jun. 23, 2016, 8 pages.

\* cited by examiner

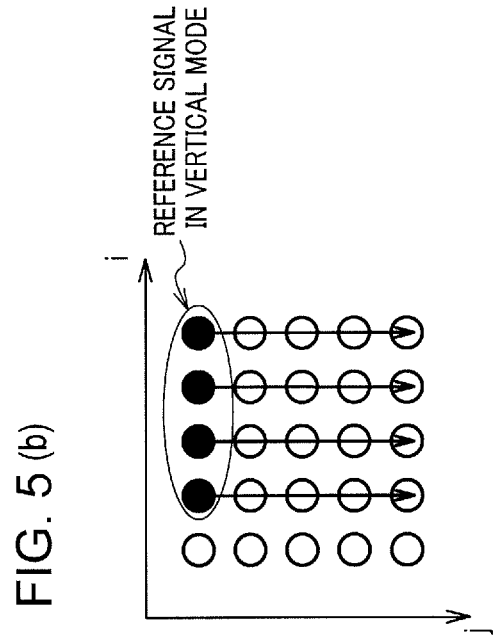
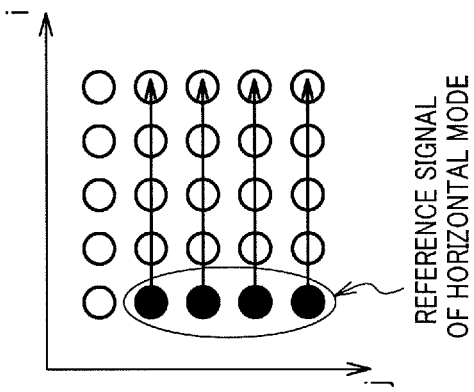

FIG. 8 (a) 4:2:2 FORMAT
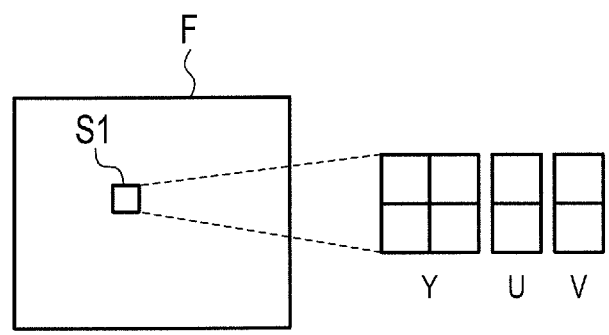
FIG. 8 (b) 4:2:0 FORMAT
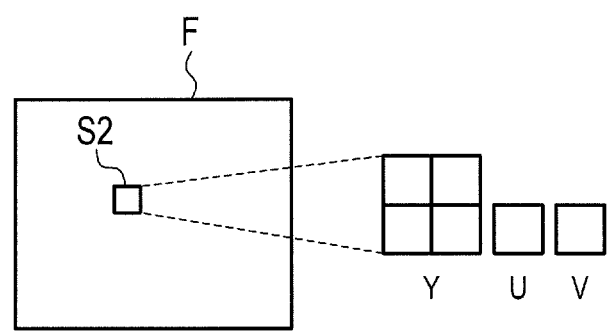

ENCODING DEVICE, DECODING DEVICE, AND PROGRAM

TECHNICAL FIELD

The present invention relates to an image processing technique, and more particularly, to an encoding device for correcting and encoding an image signal that has been encoded by an irreversible encoding method and has been degraded during encoding, a decoding device for correcting and decoding an image signal, and a program.

BACKGROUND ART

As a signal interpolation technique using a correlation between component signals that constitute image signals, a technique of improving accuracy in a pixel interpolation method in a single primary color image sensor has been proposed (e.g., see Non-Patent Literature 1). The interpolation technique of the image signal in such an image sensor is developed to interpolate RGB signals (R: red signal, G: green signal, B: blue signal) in an RGB color space. Thus, signal degradation caused by encoding is not considered.

As a signal interpolation technique focusing on a difference in sampling frequency of a YUV signal in a YUV color space, a chrominance signal interpolation technique of a format color image has been proposed (e.g., see Non-Patent Literature 2). In this technique, highly accurate interpolation is performed by generating an interpolation signal of a chrominance signal (i.e., a U signal=B−Y, a V signal=R−Y) using the height of a sampling frequency of a luminance (Y) signal. Such a signal interpolation technique focusing on a difference in a sampling frequency of a YUV signal is also developed to interpolate YUV signals. Thus, signal degradation caused by encoding is not considered.

These signal interpolation techniques are suitable to interpolate pre-decoded image signals in encoding image signals by an irreversible encoding method (e.g., MPEG-2 and H.264) but not suitable to interpolate image signals after encoding. For example, when a YUV signal is encoded by an irreversible encoding process, degradation of a luminance signal propagates to a chrominance signal based on this luminance signal as the luminance signal degrades. Since these signal interpolation techniques are not processes to reduce degradation itself of the luminance signal, degradation of the luminance signal is not reduced.

Various deblocking filters (e.g., a deblocking filter in, for example, H.264) are proposed to reduce degradation in encoding. These deblocking filters process each of image signal components independently so that degradation does not become visible. Thus, it is not necessary to reduce degradation of an original image signal after encoding.

In a related art irreversible encoding method (e.g., H.264), as a luminance signal intra-frame prediction (intra-frame prediction) method, an original signal is predicted by extrapolation using pixel information obtained by decoding a closely located encoded block which approaches as signal prediction of an encoded block, a prediction signal is generated, and a difference signal between the original signal and the prediction signal is encoded. This prediction processing is separately performed to a signal stream of each component of the three component signals on the presupposition that three component signals has no correlation among then because of their low correlation. When the signals are seen locally, however, fluctuations of signals between each component signal has a correlation, and signals can be predicted mutually. This correlation is not used in the related art encoding methods.

For example, as shown in FIG. 9, a related art encoding device 100 (e.g., an encoding device for H.264) has an encoded signal stream of a first component signal (a U signal or a V signal) and an encoded signal stream of a second component signal (a Y signal). These encoded signal streams are provided with rearrangers 12-1 and 12-2, subtracters 13-1 and 13-2, orthogonal transformers 14-1 and 14-2, quantizers 15-1 and 15-2, variable length encoders 16-1 and 16-2, inverse quantizers 17-1 and 17-2, inverse orthogonal transformers 18-1 and 18-2, memories 21-1 and 21-2, inter-frame/intra-frame predictors 22-1 and 22-2, adders 23-1 and 23-2, and a bit stream forming unit 25 that reconstructs the encoded signal of each encoded signal stream into a bit stream to be sent outside.

FIG. 9 illustrates an example in which orthogonal transformation and quantization processing are performed in parallel for each component signal, but it is also possible to perform an encoding process while sequentially reading each component signal out. In a case in which the component signal consists of a YUV signal, in performing orthogonal transformation and quantization processing, the U signal or the V signal is subject to orthogonal transformation and quantization via the orthogonal transformer 14-1 and the quantizer 15-1, respectively and, similarly, the Y signal is subject to orthogonal transformation and quantization via the orthogonal transformer 14-2 and the quantizer 15-2, respectively. Regarding a local decoding process, a signal stream switcher (not illustrated) for switching between the orthogonal transformers 14-1 and 14-2 and between the quantizers 15-1 and 15-2 may be provided so that each component signal can be sequentially read out and processed. Hereinafter, as a typical example, an inter-frame prediction operation and an intra-frame prediction operation of the encoded signal stream of the first component signal (the U signal or the V signal) are described sequentially.

[Inter-Frame Prediction]

The rearranger 12-1 makes rearrangement for the encoding the first component signal per pixel block of small areas, and sends the signal to the subtracter 13-1 and the inter-frame/intra-frame predictor 22-1.

With respect to an original signal of the first component signal supplied from the rearranger 12-1, the inter-frame/intra-frame predictor 22-1 performs motion vector detection using a reference image obtained from the memory 21-1, performs motion compensation using the obtained motion vector, and then outputs the obtained prediction signal to the adder 23-1 and the subtracter 13-1. Information about the motion vector is sent to the variable length encoder 16-1.

The subtracter 13-1 generates a difference signal between the original signal from the rearranger 12-1 and the prediction signal from the inter-frame/intra-frame predictor 22-1, and sends the generated difference signal to the orthogonal transformer 14-1.

With respect to the difference signal supplied from the subtracter 13-1, the orthogonal transformer 14-1 performs orthogonal transformation (e.g., DCT) for every pixel block of a small area and sends the signal to the quantizer 15-1.

The quantizer 15-1 selects a quantization table corresponding to a pixel block of a small area supplied from the orthogonal transformer 14-1 and performs quantization processing, sends the quantized signal to the variable length encoder 16-1 and, at the same time, sends the quantized signal to the inverse quantizer 17-1.

The variable length encoder 16-1 scans the quantized signal supplied from the quantizer 15-1, performs a variable length encoding process to generate a bit stream. At the same time, the variable length encoder 16-1 performs variable length encoding on the information about the motion vector supplied from the inter-frame/intra-frame predictor 22-1 and outputs the information.

The inverse quantizer 17-1 performs an inverse quantization process about the quantized signal supplied from the quantizer 15-1, and outputs the signal to the inverse orthogonal transformer 18-1.

The inverse orthogonal transformer 18-1 performs inverse orthogonal transformation (e.g., IDCT) to an orthogonal transformation coefficient supplied from the inverse quantizer 17-1, and outputs the coefficient to the adder 23-1.

The adder 23-1 adds the inverse orthogonal transformed signal obtained from the inverse orthogonal transformer 18-1 and the prediction signal obtained from the inter-frame/intra-frame predictor 22-1 to generate a locally decoded signal, and stores the generated signal in the memory 21-1.

The inter-frame/intra-frame predictor 22-1 may be provided with a switch (not illustrated) for switching between intra-frame prediction and inter-frame prediction.

[Intra-Frame Prediction]

The inter-frame/intra-frame predictor 22-1 predicts an original signal by extrapolation using decoded adjacent pixel information regarding the first component signal, generates a prediction signal, and sends the generated prediction signal to the subtracter 13-1 and the adder 23-1. Operations of other components can be considered to be the same as those of the case of the inter-frame prediction. For example, as an intra-frame prediction method, an encoding method for H.264 uses decoded adjacent pixel information as a reference signal and predicts an applicable component signal by extrapolation (e.g., see Patent Literature 1).

CITATION LIST

Patent Literature

Patent Literature 1: Japanese Patent Application Laid-Open No. 2005-184241

Nonpatent Literature

Non-Patent Literature 1: Kuno and Sugiura, Improved Accuracy in Pixel Interpolation for Single Primary Color Image Sensor, the Journal of The Institute of Image Information and Television Engineers Vol. 61, No. 7, Jul. 1, 2007, pp. 1006-1016

Non-Patent Literature 2: Sugita and Taguchi, "Chrominance Signal Interpolation of YUV 4:2:0 Format Color Images, The Institute of Electronics, Information and Communication Engineers Transactions, Vol. J88-A, No. 6, Jun. 1, 2005, pp. 751-760

SUMMARY OF THE INVENTION

Problem to be Sonved by the Invention

Degradation of an orthogonal transformation coefficient caused by quantization is pixel degradation caused by inverse quantization and inverse orthogonal transformation and is perceived as degradation, such as block distortion and mosquito noise. Since a degree of degradation varies in each pixel block, the variation may cause a remarkable obstruction and block distortion may be detected on a boundary of adjacent encoding blocks. In such a case, there is room to further improve block distortion by using a correlation between component signals of a moving image.

A case in which an image is encoded in the unit of small areas by an irreversible encoding method (e.g., MPEG-2 and H.264) is described. For example, in MPEG-2 and in 4:2:0 format, a chrominance signal corresponding to 16×16 pixels of a pixel block of a luminance signal is 8×8 pixels. Thus, these signals have different sampling frequencies. For example, an image encoding process represented by MPEG-2 processes signals having different sampling frequencies in the 8×8 pixel block, which is a common size. That is, since a luminance signal is divided into four 8×8 pixel blocks and a chrominance signal is encoded in the 8×8 pixel block, the area occupied by the 8×8 pixel block of the luminance signal to be encoded and the area occupied by the 8×8 pixel block of the chrominance signal are different from each other.

In an intra-frame encoding method used in a related art encoding method, pixel information obtained by decoding an adjacent encoded block is used as a reference signal to predict a corresponding component signal by extrapolation. In this extrapolation process, prediction performance degrades as the distance of the pixels from the reference signal increases and, as a result, the number of residual signals increases.

In view of the aforementioned circumstances, an object of the present invention is to provide an encoding device for encoding, using a correlation between image signals, at least two component signals indicating luminance and chrominance in original signals in a predetermined image format in order to further reduce residual signals that becomes encoding targets and to improve encoding efficiency, a decoding device for decoding the encoded component signals, and a program thereof.

Means for Solving the Problem

The present invention predicts a decrease in prediction performance caused by an extrapolation process during, for example, intra-frame prediction using a correlation in signal fluctuations between a first component signal (e.g., a U signal or a V signal) in an pre-decoded original signal and a locally decoded second component signal (e.g., a Y signal). This process is the same in a case of inter-frame prediction in which inter-frame prediction is performed. The component signal may be a signal of any color space consisting of a plurality of component signals, such as RGB, YCbCr, LUV, Lab, and XYZ.

For example, each component signal in the YUV signal during intra-frame prediction in an extrapolation process is encoded within a frame for every component signal. Then, the present invention compares signal energy in each block between a first component signal in an pre-decoded original signal (e.g., a U signal or a V signal) and a locally decoded second component signal (e.g., a Y signal), transmits a normalization parameter obtained by this comparison outside, combines a signal for predicting the first component signal (e.g., the U signal or the V signal) from the locally decoded second component signal (e.g., the Y signal) generated using the normalization parameter (hereafter, referred to as a "luminance-chrominance prediction signal") and a prediction signal of intra-frame prediction by a related art extrapolation process, and generates a corrected prediction signal. This corrected prediction signal can be configured by weighting between a related art prediction signal and the luminance-chrominance prediction signal. This weighting factor may be previously determined so as to be used commonly by both the encoding device side and the decoding device side, or may be transmitted to the decoding device side from the encoding device side as supplementary information.

That is, an encoding device of an aspect of the present invention is an encoding device for encoding at least two component signals indicating luminance and chrominance in an original signal in a predetermined image format, including: a local decoder that generates a locally decoded signal of a second component signal (e.g., a Y signal) of the at least two component signals of the at least two component signals; a comparator that generates a normalization parameter of the second component signal (e.g., the Y signal) by comparing an original signal of a pre-decoded first component signal e.g., a U signal or a V signal) with the locally decoded signal of the second component signal; a luminance-chrominance predictor that generates a luminance-chrominance prediction signal for predicting the original signal of the first component signal (e.g., the U signal or the V signal) by correcting the locally decoded signal of the second component signal (e.g., the Y signal) using the normalization parameter; a prediction signal generator that generates a prediction signal of an in-screen prediction by extrapolation or a prediction signal of an inter-screen prediction by motion-compensation, regarding the first component signal (e.g., the U signal or the V signal); a combiner that combine the prediction signal and the luminance-chrominance prediction signal by weight adding, and generates a corrected prediction signal of the first component signal (e.g., the U signal or the V signal); and an encoder that performs encoding by generating a difference signal between the corrected prediction signal and the original signal of the first component signal (e.g., the U signal or the V signal).

Further, an encoding device of an aspect of the present invention may include a sampling rate converter that converts a sampling rate of the second component signal so as to coincide with the sampling rate of the first component signal, at the timing of a comparison for generating the normalization parameter.

That is, for example, if the second component signal is a Y signal and if the first component signal is a U signal or a V signal, the Y signal is downconverted to have a sampling rate of the U signal or the V signal. On the contrary, for example, if the second component signal is the U signal or the V signal and if the first component signal is the Y signal, the U signal or the V signal is upconverted to have the sampling rate of the Y signal. This sampling rate converter is not necessary if the components to be normalized have the same sampling rate.

Further, a decoding device of an aspect of the present invention is a decoding device for decoding at least two encoded component signals indicating luminance and chrominance in a predetermined image format, including: a decoder that decodes a difference signal between an encoded original signal of a first component signal (e.g., a U signal or a V signal) of the at least two component signals and a prediction signal; a local decoder that generates a locally decoded signal of a second component signal (e.g., a Y signal) of the at least two component signals; a luminance-chrominance predictor that compares the original signal of the pre-decoded first component signal (e.g., the U signal or the V signal) with the locally decoded signal of the second component signal (e.g., the Y signal), obtains a previously generated normalization parameter of the second component signal (e.g., the Y signal), and generates a luminance-chrominance prediction signal for predicting the first component signal (e.g., the U signal or the V signal) by correcting the locally decoded signal of the second component signal (e.g., the Y signal) using the normalization parameter; a prediction signal generator that generates a prediction signal of an in-screen prediction by extrapolation or a prediction signal of an inter-screen prediction by motion-compensation, regarding the first component signal (e.g., the U signal or the V signal); a combiner for that combines the prediction signal and the luminance-chrominance prediction signal by weight-adding, and generates a corrected prediction signal of the first component signal (e.g., the U signal or the V signal); and a decoder that restores the first component signal (e.g., the U signal or the V signal) by adding the corrected prediction signal and the decoded difference signal.

In a decoding device of an aspect of the present invention, in the same manner as the encoding side, a sampling rate converter may be provided for converting a sampling rate of the second component signal so as to coincide with the sampling rate of the first component signal, at a timing of a comparison for generating the normalization parameter.

An encoding device and a decoding device of an aspect of the present invention may be configured as a computer, and may be configured as a program for executing each process.

Each of the encoding device and the decoding device of the present invention may be configured as a computer, and the present invention may be characterized also as a program for executing each of the processes of the encoding device and the decoding device.

Advantage of Invention

According to the present invention, even an image signal encoded by an irreversible encoding method can be corrected as an image with little image degradation and, when the corrected image is displayed on a display device, image degradation can be further reduced as compared with a case in which the present invention is not applied.

BRIEF DESCRIPTION OF DRAWINGS

FIGS. 5(a) and 5(b) are diagrams illustrating an example of a signal prediction mode of a related art intra-frame prediction system, such as H.264.

FIG. 8(a) is a diagram illustrating an example of a signal in 4:2:2 format in a frame image and FIG. 8(b) is a diagram illustrating an example of a signal in 4:2:0 format in a frame image.

DESCRIPTION OF EMBODIMENTS

Hereinafter, an encoding device and a decoding device of an embodiment according to the present invention are described.

Figure 4:
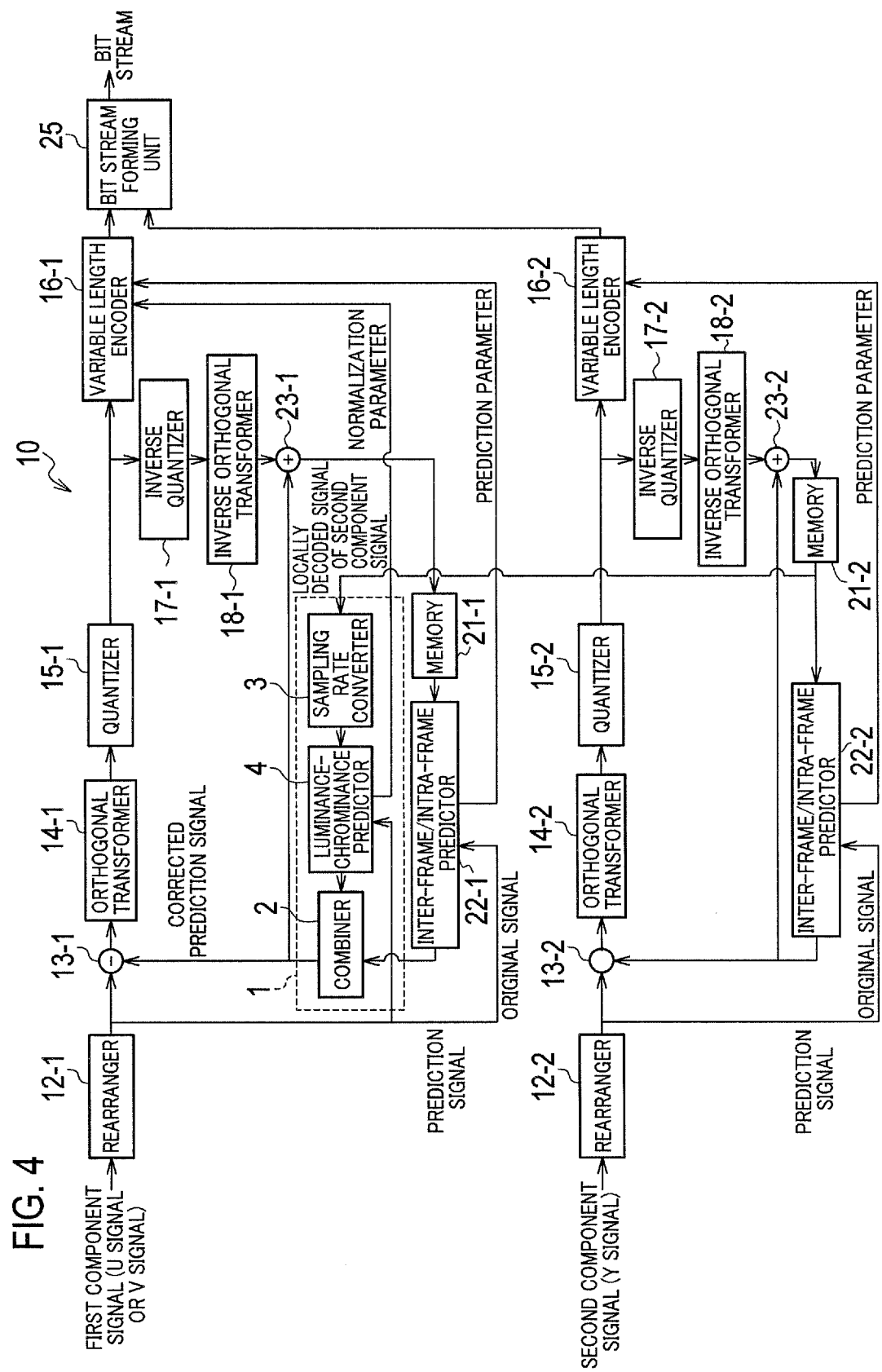
FIG. 4 is a block diagram of an encoding device of an example according to the present invention.

First, a typical image format used in encoding an image is described to facilitate understanding of the present invention. In typical image encoding, one frame of image frame is configured by a combination of signals of different pixel sizes due to a difference in human being's sensitivity in perception to luminance and chrominance. Examples of such image formats include 4:2:2 format (in the horizontal direction, the number of pixels of each of the U signal and the V signal is ½ whereas the number of pixels of the luminance signal (Y) is 1) regarding a pixel S1 in a frame image F as illustrated in FIGS. 8(a), and 4:2:0 format (in the horizontal and vertical directions, the number of pixels of each of the U signal and the V signal is ½ whereas the number of pixels of the luminance signal is 1) regarding a pixel S2 in a frame image F as illustrated in FIG. 8(b).

In typical block encoding, such as MPEG, these image signals are encoded for every predetermined number of pixels regardless of whether it is a luminance signal and a chrominance signal. Therefore, an image area occupied by the encoding block of the luminance signal and an image area occupied by the encoding block of the chrominance signal are different from each other, whereby areas in which encoding degradation is caused also differ from each other.

A difference in the sampling number represented by the luminance signal and the chrominance signal means a difference in sampling frequency between the luminance signal and the chrominance signal. For example, in the case of 4:2:2 format, each of two chrominance signals (i.e., the U signal and the V signal) corresponding to the image area constituted by the luminance signal of 16×16 pixels is constituted by 8×16 pixels. Therefore, in 4:2:2 format, the sampling frequency of the chrominance signal becomes half of the sampling frequency of the luminance signal in the horizontal direction. Similarly, in 4:2:0 format, the sampling frequency of the chrominance signal becomes half of the sampling frequency of the luminance signal in the horizontal and the vertical directions.

The encoding device and the decoding device of one example according to the present invention are devices for reducing signal degradation produced due to a difference in characteristics of encoding degradation between the luminance signal and the chrominance signal using a difference in this sampling frequency.

Comprehensively, as described in detail with reference to FIG. 4, an encoding device 10 of one example according to the present invention includes: a local decoder for generating a locally decoded signal of a second component signal of the at least two component signals (17-1, 17-2, 18-1, 18-2, 23-1 and 23-2); a luminance-chrominance predictor (4) for comparing the original signal of a pre-decoded first component signal with a locally decoded signal of the second component signal, generating a normalization parameter indicating a correcting amount for correcting the locally decoded signal of the second component signal, correcting, using the normalization parameter, the locally decoded signal of the second component signal and generating a luminance-chrominance prediction signal for predicting the original signal of the first component signal; a prediction signal generator (22-1) for generating, regarding the first component signal, a prediction signal of an intra-frame prediction by extrapolation, or a prediction signal of an inter-frame prediction by motion-compensation; a combiner (2) for combining the prediction signal and the luminance-chrominance prediction signal by weight-adding, and generates a corrected prediction signal of the first component signal; and an encoder (13-1, 14-1, 15-1 and 16-1) for generating a difference signal between the corrected prediction signal and the original signal of the first component signal, and encoding.

An encoding device of one example according to the present invention may be, in an encoding device of one aspect according to the present invention, configured to convert a sampling rate of a second component signal (e.g., a Y signal) so as to coincide with a sampling rate of a first component signal (e.g., a U signal) at the time of a comparison for generating the normalization parameter. Hereinafter, a typical example in which an original signal of the first component signal (a U signal or a V signal) is compared to predict from a locally decoded signal of the second component signal (a Y signal), and a normalization parameter indicating a correcting amount for correcting the locally decoded signal of the second component signal (e.g., the Y signal) is generated based on the comparison result is described in detail.

Figure 1:
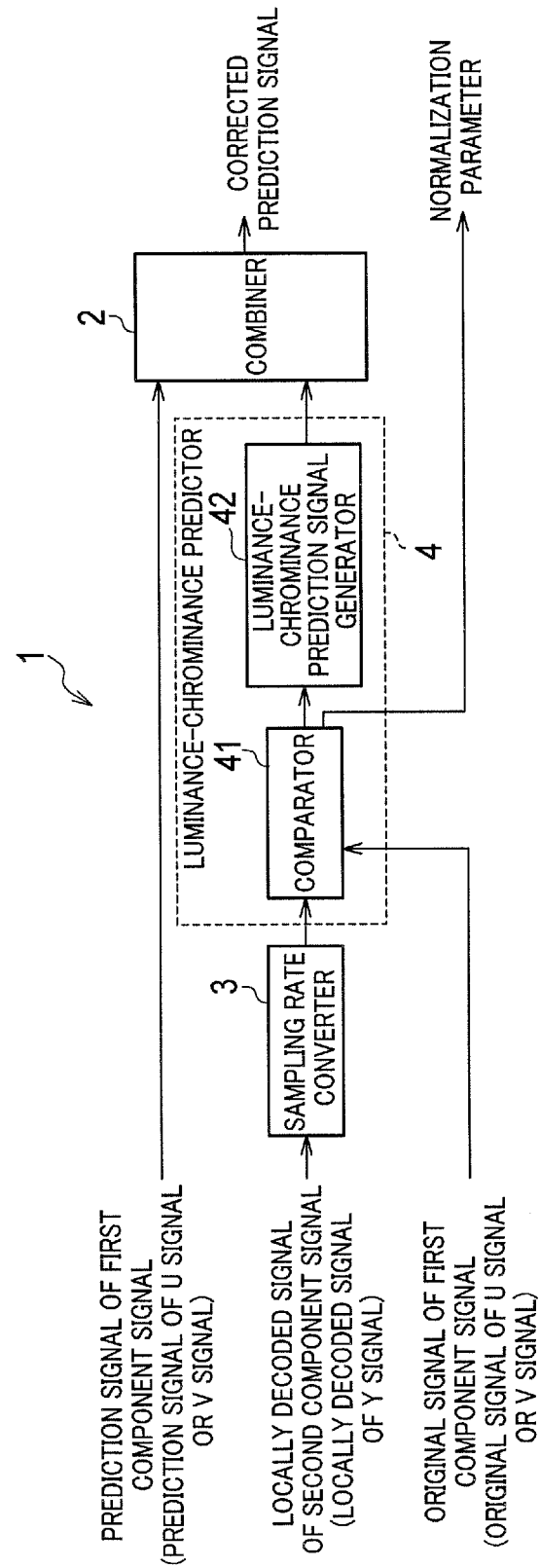
FIG. 1 is a block diagram of an image processing apparatus in an encoding device of an example according to the present invention.

First, FIG. 1 is a block diagram of an image processing apparatus according to an encoding device of one example of the present invention. An image processing apparatus 1 is an apparatus for processing component signals in a predetermined image format sequentially output from a decoder (not illustrated) that decodes image signals encoded, for example in an irreversible encoding method. The image processing apparatus 1 compares signal energy in each block between the original signal of the pre-decoded first component signal (e.g., the U signal or the V signal) and the locally decoded signal of the second component signal (e.g., the Y signal), transmits a normalization parameter obtained by this comparison outside, combines a luminance-chrominance prediction signal generated by this normalization parameter and a prediction signal of related art intra-frame or inter-frame prediction, and generates a corrected prediction signal.

More specifically, the image processing apparatus 1 is provided with a combiner 2, a sampling rate converter 3, and a luminance-chrominance predictor 4. The luminance-chrominance predictor 4 is provided with a comparator 41 and a luminance-chrominance prediction signal generator 42.

Figure 2:
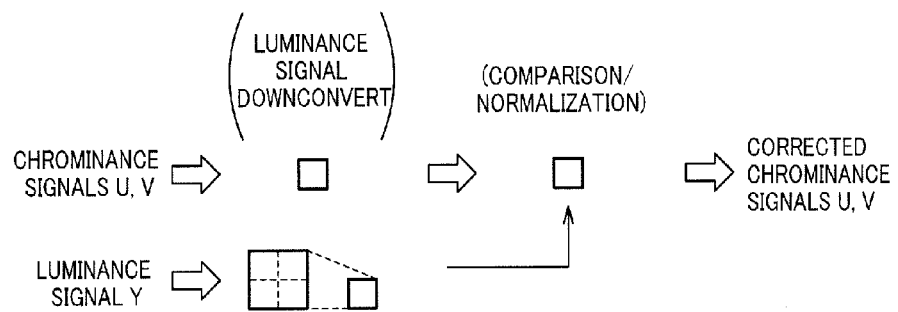
FIGS. 2(a) and 2(b) illustrate an operation of an image processing apparatus in an encoding device of an example according to the present invention, FIG. 2(a) illustrating a state in which a U signal and a V signal, which are locally decoded chrominance signals in 4:2:0 format, are corrected using a luminance signal Y of a downconverted original signal, and FIG. 2(b) illustrating a state in which a locally decoded luminance signal Y in 4:2:0 format is corrected using a U signal or a V signal, which is a chrominance signal of an upconverted original signal.
Figure 2:
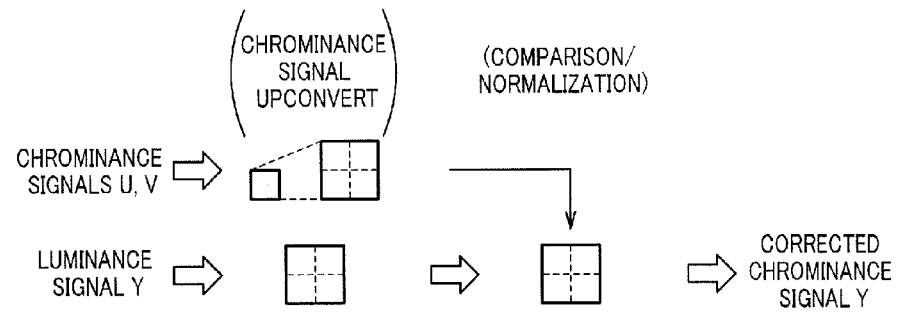
Figure 3A:
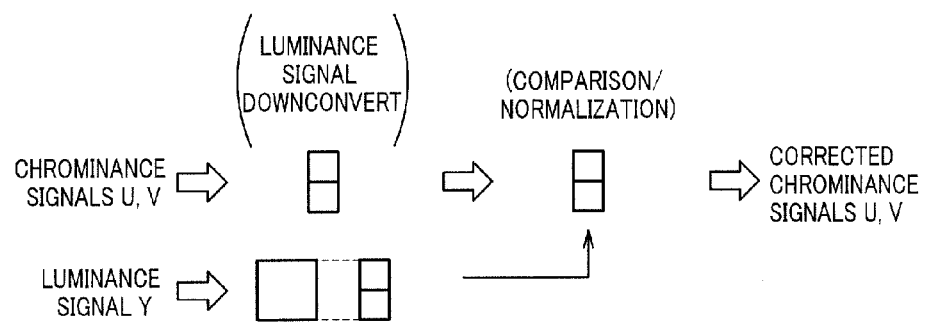
FIGS. 3(a) and 3(b) illustrate an operation of an image processing apparatus in an encoding device of an example according to the present invention, FIG. 3(a) illustrating a state in which a U signal and a V signal, which are locally decoded chrominance signals in 4:2:2 format, are corrected using a luminance signal Y of a downconverted original signal, and FIG. 3(b) illustrating a state in which a locally decoded luminance signal Y in 4:2:2 format is corrected using a U signal or a V signal, which is a chrominance signal of an upconverted original signal.
Figure 3B:
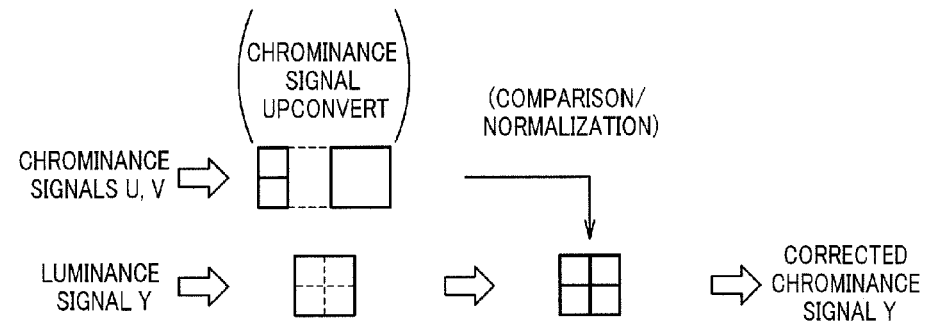

The sampling rate converter 3 inputs the locally decoded signal of the second component signal (e.g., the Y signal) obtained after local decoding, downconverts or upconverts the locally decoded signal so as to have the same sampling rate as that of the first component signal of the prediction object (e.g., the U signal) (see FIGS. 2 and 3).

The comparator 41 compares a signal element (e.g., each pixel value in the block unit) of the locally decoded signal of the second component signal (e.g., the Y signal) with a signal element of an original signal of the first component signal (e.g., the U signal) in energy (e.g., by obtaining the sum of the squares of pixel values, or the average energy per pixel), generates a normalization parameter indicating a correcting amount for the normalization, and sends the normalization parameter outside and to the luminance-chrominance prediction signal generator 42.

Alternatively, in a case in which a signal element to be compared is a orthogonal transformation coefficient, the comparator 41 may obtain a normalization parameter from the component of the orthogonal transformation coefficient by calculating and comparing energies. In determining the normalization parameter, the comparator 41 determines a value normalized with respect to a signal from which a DC component of each component signal to be compared has been removed. The DC component may be removed by, for example, subtracting an average value of all the pixels in the block from each pixel value in the encoding block. As described above, correction accuracy of the comparator 41 is improved by first converting the sampling rates of the component signals into the same, comparing energy of the corresponding signal element of each component signal (that is, comparing signal energy except for the DC component), and generating the normalization parameter. In a case in which the sampling rates of the component signals of comparison target are the same, the sampling rate converter 3 can be bypassed.

The luminance-chrominance prediction signal generator 42 corrects the signal element of the locally decoded signal of the second component signal (e.g., the Y signal) by the above-described normalization parameter, generates the luminance-chrominance prediction signal for predicting the first component signal, and sends the generated signal to the combiner 2.

An example in which the original signal of the first component signal (the U signal or the V signal) is predicted from the locally decoded signal of the second component signal (the Y signal) is described in the present embodiment. Alternatively, an example in which the second component signal is the U signal or the V signal, and the original signal of the Y signal which becomes the first component signal is predicted from this locally decoded signal may be implemented similarly.

As described above regarding the sampling rates between the component signals, a pixel block (8×8 pixels) of one luminance signal, which is the minimum unit of the encoding process and a pixel block (8×8 pixels) of one chrominance signal, which is the minimum unit of the encoding process have different image areas to be expressed due to a difference in the sampling number of the luminance signal and the chrominance signal. Degradation due to quantization differs for every 8×8-pixel pixel block and tendencies of degradation between blocks are not correlated. Thus, noticeable degradation may be caused especially on a boundary between pixel blocks. This also applies to, for example, a 16×16 pixel-pixel block and a 32×32-pixel pixel block.

However, considering that an area of the encoded chrominance signal is twice an area of the encoded luminance signal in the horizontal direction (or in the horizontal and vertical directions), a correlation in signal fluctuation between adjacent pixel blocks of the corresponding luminance signal can be obtained from this chrominance signal. Since the sampling number of the luminance signal is greater than that of the chrominance signal and resolution of the luminance signal is higher than that of the chrominance signal, the sampling rate of the luminance signal including encoding degradation may be downconverted to the sampling rate of the chrominance signal to reduce degradation, and the chrominance signal may be restored by using the luminance signal with reduced degradation as a teacher signal of the chrominance signal. Although YUV 4:2:0 format or 4:2:2 format is described as an example about twice the area above, the present invention is not limited to the same. The present invention is applicable to a component signal of any other color space involving in two or more component signals. Thus, for the correlation comparison between the luminance signal and the chrominance signal, it is desirable to make the sampling rate of the luminance signal and the sampling rate of the chrominance signal coincide with each other.

FIGS. 2 and 3 are diagrams schematically illustrating a series of process operations in the image processing apparatus 1. FIG. 2(*a*) illustrates a state in which the U signal and the V signal of a locally decoded chrominance signal in 4:2:0 format are corrected using a downconverted luminance signal Y of an original signal, and FIG. 2(*b*) illustrates a state in which a locally decoded luminance signal Y in 4:2:0 format is corrected using a U signal or a V signal, which is an upconverted chrominance signal of an original signal. FIG. 3(*a*) illustrates a state in which the U signal and the V signal of a locally decoded chrominance signal in 4:2:2 format are corrected using a downconverted luminance signal Y of an original signal, and FIG. 3(*b*) illustrates a state in which a locally decoded luminance signal Y in 4:2:2 format is corrected using a U signal or a V signal, which is an upconverted chrominance signal of an original signal.

FIG. 4 is a block diagram of an encoding device of an example according to the present invention. An encoding device 10 of the present embodiment (e.g., an encoding device for H.264) differs from the related art encoding device 100 illustrated in FIG. 9 in that the image processing apparatus 1 (see FIG. 1) especially for the generation of a prediction signal is incorporated in a processing system of the first component signal.

Figure 9:
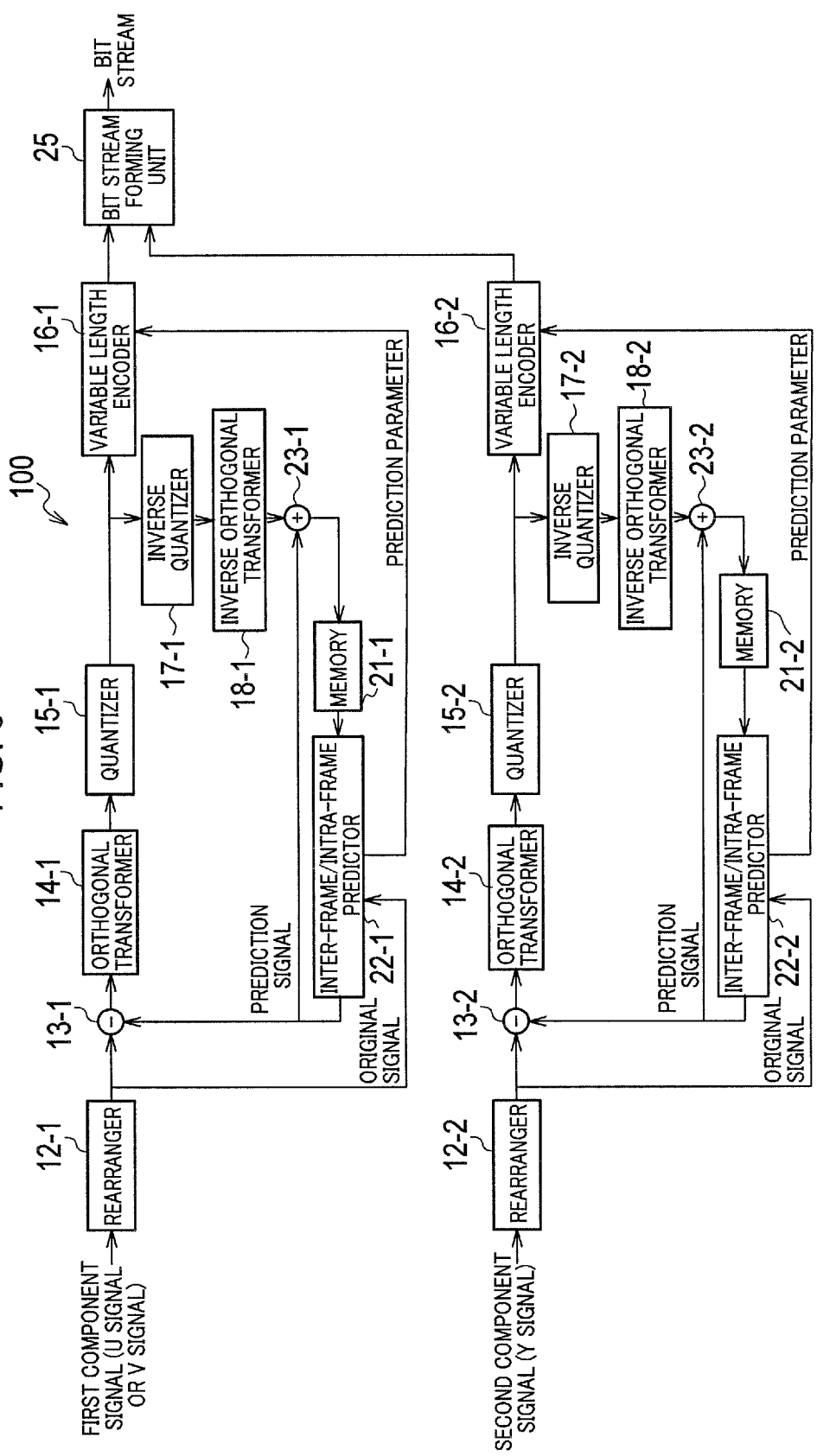
FIG. 9 is a block diagram illustrating a related art encoding device.

Operations of other components of the encoding device 10 of the present embodiment are the same as those of the related art encoding device 100 illustrated in FIG. 9 and, therefore, portions related to the present invention are described in detail.

Also in the present embodiment, the orthogonal transformation and the quantization processing may be performed in parallel for every component signal whereas the local decoding process may be performed while sequentially reading the component signals out.

As described with reference to FIG. 1, the image processing apparatus 1 compares each element of the original signal of the first component signal input from the rearranger 12-1 with each element of the locally decoded signal of the second component signal input from the memory 21-2 in an encoded signal stream of the second component signal at a corresponding pixel position that constitutes the image frame, generates the luminance-chrominance prediction signal for predicting the first component signal from the locally decoded signal of the second component signal, and sends the normalization parameter indicating this correcting amount to the variable length encoder 16-1.

The combiner 2 in the image processing apparatus 1 generates a corrected prediction signal by combining a prediction signal, that is obtained by existing prediction processing, supplied from the inter-frame/intra-frame predictor 22-1 and a luminance-chrominance prediction signal supplied from the luminance-chrominance predictor 4 by weight-adding, and outputs the generated signal to the adder 23-1 and the subtracter 13-1. The information about the prediction parameter obtained by existing prediction processing is sent to the variable length encoder 16-1. The weight-adding is described in detail later.

An operation of the combiner 2 is described. The combiner 2 weight-adds the prediction signal obtained in the intra-frame predictor or the inter-frame predictor and the luminance-chrominance prediction signal input from the luminance-chrominance predictor 4, and generates a corrected prediction signal. For example, in a case of intra-frame prediction, the combiner 2 weight-adds the prediction signal and the luminance-chrominance prediction signal with a distribution proportional to the distance from the reference signal of the adjacent encoded block, and generates a corrected prediction signal.

Examples of the signal prediction modes of the related art intra-frame prediction method, such as H.264, include a horizontal prediction mode in which the encoding block consists of 4×4 pixels (see FIG. 5(*a*)) and a vertical prediction mode (see FIG. 5(*b*)).

For example, weight-addition of the prediction signal and the luminance-chrominance prediction signal in the combiner 2 can be expressed in the following Expression:

Corrected prediction signal $C[j][i]=(k1/K)\cdot A[j][i]+(k2/K)\cdot B[j][i]$.

Where i and j each denote horizontal and vertical pixel positions, k1 and k2 each denote weighting factors to each of a prediction signal $A[j][i]$ and a luminance-chrominance prediction signal $B[j][i]$. Here, $K=k1+k2$.

The weighting factors k1 and k2 may be predetermined fixed values, may be predetermined variables that vary depending on the size of the luminance-chrominance prediction signal $B[j][i]$ or the prediction signal $A[j][i]$, or may be predetermined variables that vary depending on flags indicating ranks in accordance with quantization levels of a comparing operation used at the timing of generation of the luminance-chrominance prediction signal $B[j][i]$. For example, as an example, as a result of comparison of prediction signal $A[j][i]$ and luminance-chrominance prediction signal $B[j][i]$, when difference of direct current level is large, weighting factor k2 can be made small. Regarding these weighting factors k1 and k2, a common calculation method or fixed values may be kept between the encoding device and the decoding device, or the encoding device may generate supplementary information and transmit the generated information to the decoding device.

For example, in the example of FIG. 5(*a*), the corrected prediction signal $C[j][i]$ is obtained from the following Expression by combining the related art prediction signal $A[j][i]$ and the luminance-chrominance prediction signal $B[j][i]$ from the luminance-chrominance predictor 4 by weight adding:

$C[j][i]=(3-i)/3\cdot A[j][i]+i/3\cdot B[j][i]$.

For example, in the example of FIG. 5(*b*), the corrected prediction signal $C[j][i]$ is obtained from the following Expression by combining the related art prediction signal $A[j][i]$ and the luminance-chrominance prediction signal $B[j][i]$ from the luminance-chrominance predictor 4 by weight adding:

$C[j][i]=(3-j)/3\cdot A[j][i]+j/3\cdot B[j][i]$.

As an example of other operations, the combiner 2 may weight-add a prediction signal and a plurality of luminance-chrominance prediction signals and generate a corrected prediction signal. For example, the luminance-chrominance prediction signal for predicting the Y signal from the U signal, and the luminance-chrominance prediction signal for predicting the Y signal from the V signal are exemplified.

For example, weight-addition between a prediction signal and a plurality of luminance-chrominance prediction signals may be expressed by the following Expression:

$C[j][i]=(k1/K)\cdot A[j][i]+(k2/K)\cdot B1[j][i]+(k3/K)\cdot B2[j][i]$.

Where i and j each denote horizontal and vertical pixel positions, and k1, k2 and k3 denote weighting factors with respect to the prediction signal $A[j][i]$, a plurality of luminance-chrominance prediction signals $B1[j][i]$ and $B2[j][i]$, respectively. Here, $K=k1+k2+k3$.

Also regarding these weighting factors k1, k2 and k3, a common calculation method or fixed values may be kept between the encoding device and the decoding device, or the encoding device may generate supplementary information and transmit the generated information to the decoding device.

Although intra-frame prediction in the combiner 2 is described above, the same applies to inter-frame prediction in the combiner 2.

Next, the decoding device 31 of the present embodiment is described.

[Decoding Device]

Figure 6:
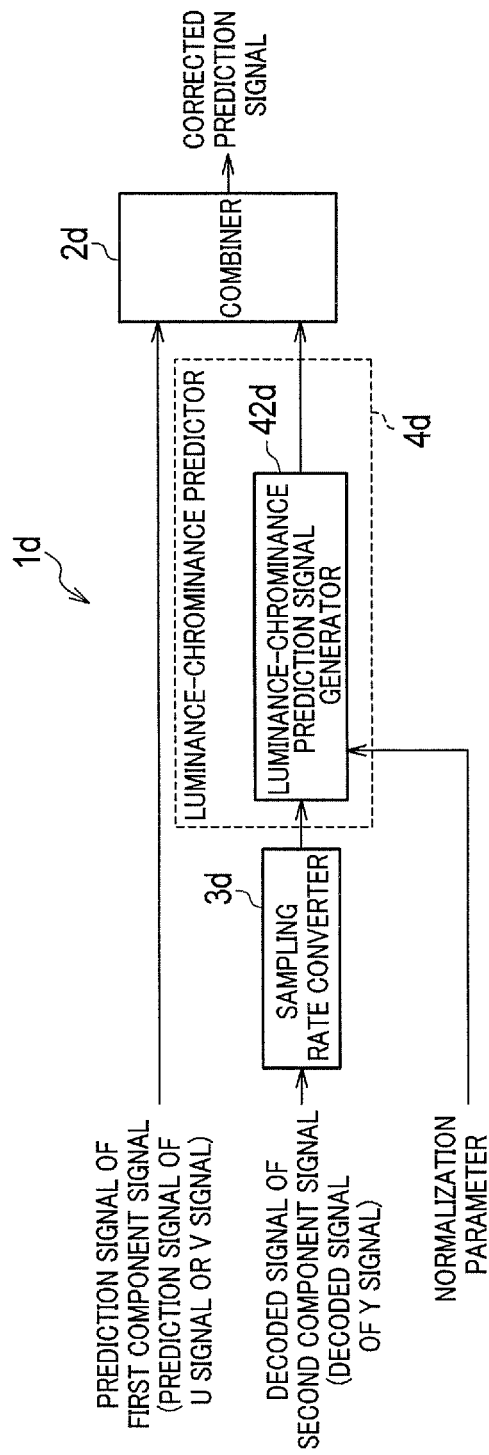
FIG. 6 is a block diagram of an image processing apparatus in a decoding device of an example according to the present invention.
Figure 7:
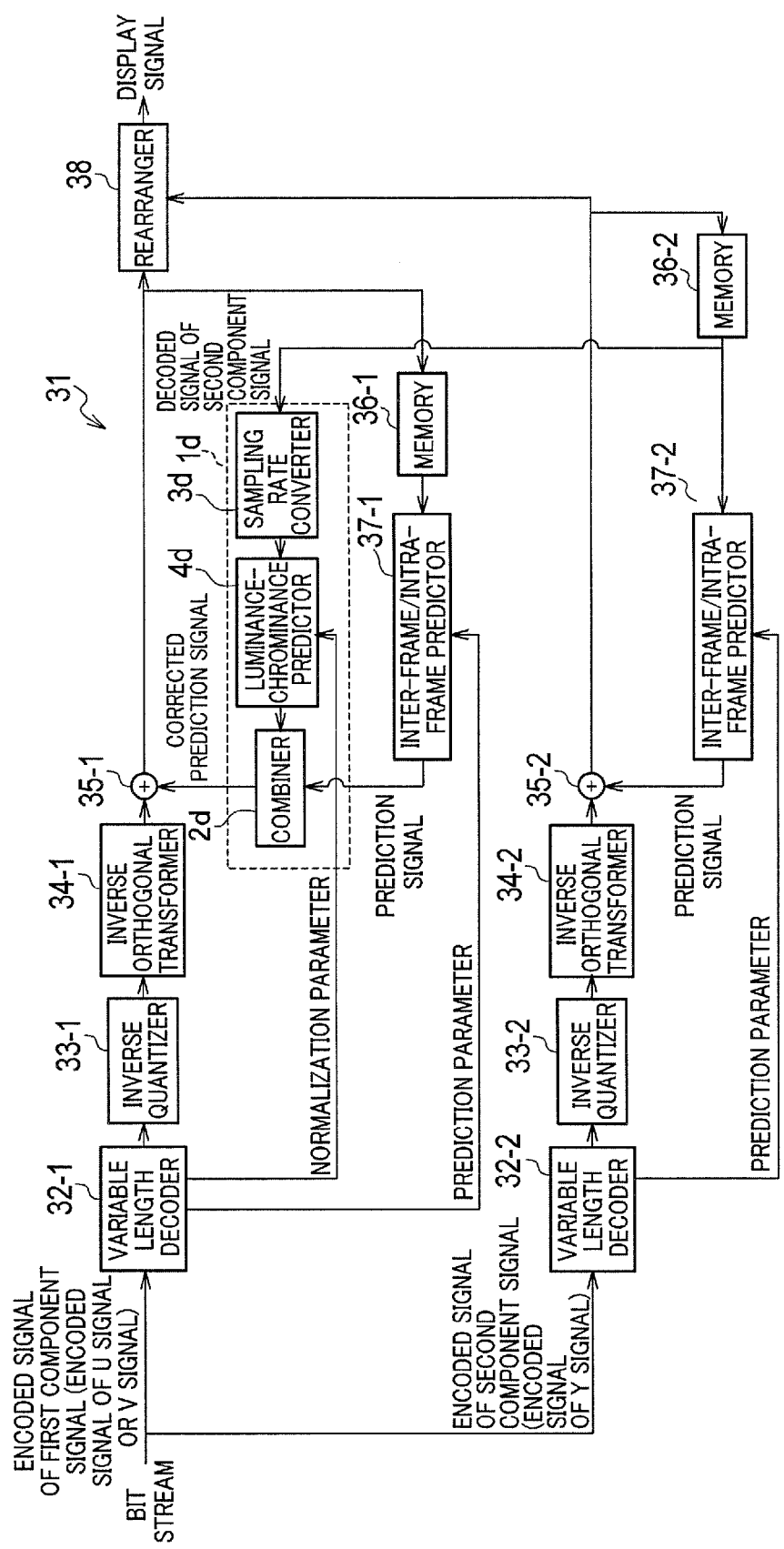
FIG. 7 is a block diagram of a decoding device of an example according to the present invention.

An image processing apparatus 1*d* provided in the decoding device 31 of the present embodiment is illustrated in FIG. 6. FIG. 7 is a block diagram of the decoding device 31 according to the present embodiment. With reference to FIGS. 6 and 7, the decoding device 31 of the present invention differs from a related art decoding device in that the image processing apparatus 1*d* is added to the decoding device. The image processing apparatus 1*d* is provided with a combiner 2*d*, a sampling rate converter 3*d*, and a luminance-chrominance predictor 4*d*. The combiner 2*d*, the sampling rate converter 3*d*, and the luminance-chrominance predictor 4*d* each correspond to the combiner 2, the sampling rate converter 3, and the luminance-chrominance predictor 4 on the encoder side, respectively, and operate similarly. Although the luminance-chrominance predictor 4 sends the normalization parameter outside, the luminance-chrominance predictor 4*d* obtains a normalization parameter from the outside, and is provided with a luminance-chrominance prediction signal generator 42*d* for generating a luminance-chrominance prediction signal.

Like a related art decoding device, the decoding device 31 according to the present embodiment may be constituted by, at least for the processing of the luminance signal and the chrominance signal, a decoding process system for decoding the encoded signal of the first component signal (e.g., the U signal or the V signal) and a decoding process system for decoding the encoded signal of the second component signal (e.g., the Y signal).

More specifically, the decoding device 31 according to the present embodiment includes, as two decoding process systems: variable length decoders 32-1 and 32-2, inverse quantizers 33-1 and 33-2, inverse orthogonal transformers 34-1 and 34-2, adders 35-1 and 35-2, an image processing apparatus 1*d*, memories 36-1 and 36-2, inter-frame/intra-frame predictors 37-1 and 37-2, and a rearranger 38. In the example illustrated in FIG. 7, it is considered that the decoding process for decoding the encoded signal of the second component signal (e.g., the Y signal) is identical to that of the related art. Thus, as a typical example, a decoding process for decoding the encoded signal of the second component signal (e.g., the Y signal) is described.

In the image processing apparatus 1d, with reference to FIG. 6, the sampling rate converter 3d converts the sampling rate of the decoded signal of the second component signal (e.g., the Y signal) in the same manner as described above, the luminance-chrominance predictor 4d generates a luminance-chrominance prediction signal by making correction using a normalization parameter sent from the encoding device 10, the combiner 2d combines by weight-adding this luminance-chrominance prediction signal and a prediction signal generated by the same technique as that of the related art in the inter-frame/intra-frame predictor 37-1 for the second component signal (e.g., the U signal) (a prediction signal of intra-frame prediction by extrapolation, or a prediction signal of inter-frame prediction by motion compensation), and generates a corrected prediction signal. This normalization parameter is generated by the encoding device 10 to indicate the correcting amount for correcting the signal element of the locally decoded signal of the second component signal based on the signal element of the original signal of the first component signal. Thus, the corrected prediction signal obtained from the combiner 2d may be combined by adding so as to be equivalent to the corrected prediction signal obtained from the combiner 2 on the side of the encoding device 10, and the signal may be restored to a value that is very close to the original signal value.

[Operation at Inter-Frame Prediction]

With reference to FIG. 7, the variable length decoder 32-1 inputs a bit stream encoded in inter-frame prediction, performs a variable length decoding process, sends the signal to the inverse quantizer 33-1, decodes information about a motion vector, sends the information to the inter-frame/intra-frame predictor 37-1, decodes the normalization parameter and sends the decoded normalization parameter to the image processing apparatus 1d.

The inverse quantizer 33-1 performs an inverse quantization process to a quantized signal supplied from the variable length decoder 32-1, obtains an orthogonal transformation coefficient of a difference signal for which motion compensation has been performed, and sends the orthogonal transformation coefficient to the inverse orthogonal transformer 34-1.

The inverse orthogonal transformer 34-1 performs inverse orthogonal transformation (e.g., IDCT) to an orthogonal transformation coefficient of a difference signal supplied from the inverse quantizer 33-1, and sends the obtained difference signal to the adder 35-1.

As described with reference to FIG. 6, the image processing apparatus 1d corrects the decoded signal of the second component signal obtained from the memory 36-2 using the normalization parameter input from the variable length decoder 32-1, generates the luminance-chrominance prediction signal for predicting the first component signal, combines by adding the luminance-chrominance prediction signal and the prediction signal obtained by existing motion compensation from the inter-frame/intra-frame predictor 37-1 to generate a corrected prediction signal, and sends the generated signal to the adder 35-1.

The combiner 2d can generate a corrected prediction signal by combining by weight-adding similar to the combiner 2 on the encoding side.

The adder 35-1 adds the difference signal obtained from the inverse orthogonal transformer 34-1 and the corrected prediction signal supplied from the combiner 2d, restores the first component signal (e.g., the U signal), and sends the restored first component signal to the rearranger 38.

The rearranger 38 rearranges the restored first component signal (e.g., the U signal) as a display signal.

[Operation at Intra-Frame Prediction]

The variable length decoder 32-1 inputs a bit stream encoded in intra-frame prediction, performs the variable length decoding process, and sends the bit stream to the inverse quantizer 33-1. The variable length decoder 32-1 sends a related art prediction parameter used for extrapolation to the inter-frame/intra-frame predictor 37-1 and, at the same time, sends the normalization parameter to the image processing apparatus 1d.

The inverse quantizer 33-1 performs an inverse quantization process to a quantized signal supplied from the variable length decoder 32-1, obtains an orthogonal transformation coefficient of a difference signal for which motion compensation has been performed, and sends the orthogonal transformation coefficient to the inverse orthogonal transformer 34-1.

The inverse orthogonal transformer 34-1 performs inverse orthogonal transformation (e.g., IDCT) to an orthogonal transformation coefficient of a difference signal supplied from the inverse quantizer 33-1, and sends the obtained difference signal to the adder 35-1.

As described with reference to FIG. 6, the image processing apparatus 1d corrects the decoded signal of the second component signal obtained from the memory 36-2 using the normalization parameter input from the variable length decoder 32-1, generates the luminance-chrominance prediction signal for predicting the first component signal, combines by adding the luminance-chrominance prediction signal and the prediction signal obtained by existing extrapolation from the inter-frame/intra-frame predictor 37-1 to generate a corrected prediction signal, and sends the generated signal to the adder 35-1.

Therefore, the operation of the combiner 2d is the same as that of the combiner 2 in the encoding device 10.

The adder 35-1 adds the difference signal obtained from the inverse orthogonal transformer 34-1 and the corrected prediction signal supplied from the inter-frame/intra-frame predictor 37-1, restores the first component signal (e.g., the U signal), and sends the restored first component signal to the rearranger 38.

The rearranger 38 rearranges the restored first component signal (e.g., the U signal) as a display signal.

According to the decoding device 31 of the present embodiment, since decoding is performed using a normalization parameter, a component signal close to an pre-decoded original signal can be restored.

Therefore, according to the encoding device and the decoding device of the present embodiment, even an image signal encoded by an irreversible encoding method can be corrected as an image with little image degradation and, image degradation caused by encoding can further be reduced.

DCT is used for orthogonal transformation in many encoding methods, such as MPEG-4 AVC/H.264. According to the image processing apparatus in the encoding device and the decoding device of the present embodiment, however, since a difference in sampling frequency of a luminance signal and a chrominance signal of a typically used image signal is used, the present invention can be applied to any encoding method. Especially in a case in which an image degraded by being encoded by an irreversible encoding method is input and the degradation caused by the encoding method is to be recovered, the effect of reducing degradation is enhanced by using the same orthogonal transformation as the encoding method used in the input.

As another aspect of the present invention, the encoding device or the decoding device of the present invention may be configured as a computer. A program for making the computer implement each component of the encoding device or the decoding device described above is stored in a storage device provided inside or outside the computer. Such a storage device may be implemented by an external storage device, such as external hard disk, or an internal storage device, such as ROM and RAM. A controller provided in the computer may be implemented by the control of, for example, a central processing unit (CPU). That is, the CPU may suitably read, from the storage device, a program in which process content for implementing functionality of each component is described, and make the functionality of each component implement on the computer. Here, the functionality of each component may be implemented at a part of hardware.

Further, a program in which this process content is described may be distributed by, for example, selling, transferring, and lending a portable recording medium, such as DVD or CD-ROM. Alternatively, such a program may be stored in, for example, storage of a network server and may be distributed by transferring the program to other computers from the server via the network.

The computer that executes such a program may, for example, once store a program recorded on a portable recording medium or a program transferred from a server in its own storage. As another embodiment of this program, a computer may directly read a program from a portable recording medium and execute a process in accordance with the program. Further, the computer may sequentially execute a process in accordance with a program each time the program is transferred to the computer from a server.

Although embodiments of the present invention have been described in detail with reference to concrete examples, it is obvious to those skilled in the art that various changes and modifications may be made without departing from the scope of the accompanying claims.

For example, the encoding device according to the present invention has various modifications including the following: the encoding device may be used to compare signals for which each component signal has been input and a sampling rate has been converted; the encoding device may be used to compare orthogonal transformation coefficients of signals for which each component signal has been input and a sampling rate has been converted; and the encoding device may be used to compare, after quantization, signals for which a signal of an orthogonal transformation coefficient of each component signal has been input and a sampling rate has been converted. When, for example, at least two component signals indicating luminance and chrominance are to be encoded or decoded and if other component signals cannot be predicted using a locally decoded component signal (e.g., in a start area of the encoding process or the decoding process, and an edge portion of an image frame), the encoding device or the decoding device according to the present invention may perform a related art process. Then, when a locally decoded component signal is stored in a memory and a component signal comparison at a corresponding pixel position becomes possible, the encoding device or the decoding device may perform a component signal comparison.

INDUSTRIAL APPLICABILITY

According to the present invention, an image signal consisting of signal components of a color space of different sampling frequencies can be corrected so that degradation in the image signal is reduced. Thus, the present invention is useful in any use in which image signal is involved in an encoding process by an irreversible encoding method.

DESCRIPTION OF REFERENCE NUMERALS 1, 1*d* Image Processing Apparatus
2, 2*d* Combiner
3, 3*d* Sampling Rate Converter
4, 4*d* Luminance-Chrominance Predictor
10 Encoding Device
12-1, 12-2 Rearranger
13-1, 13-2 Subtracter
14-1, 14-2 Orthogonal Transformer
15-1, 15-2 Quantizer
16-1, 16-2 Variable Length Encoder
17-1, 17-2 Inverse Quantizer
18-1, 18-2 Inverse Orthogonal Transformer
21-1, 21-2 Memory
22-1, 22-2 Inter-Frame/Intra-Frame Predictor
23-1, 23-2 Adder
25 Bit Stream Forming Unit
31 Decoding Device
32-1, 32-2 Variable Length Decoder
33-1, 33-2 Inverse Quantizer
34-1, 34-2 Inverse Orthogonal Transformer
35-1, 35-2 Adder
36-1, 36-2 Memory
37-1, 37-2 inter-frame/intra-frame Predictor
38 Rearranger
41 Comparator
42, 42*d* Luminance-Chrominance Prediction Signal Generator
100 Encoding Apparatus

The invention claimed is:
1. An encoding device for processing an image signal, the encoding device comprising:
 a first predictor that generates a luminance prediction signal which is a prediction signal of a luminance signal using an intra-frame prediction or an inter-frame prediction;
 a second predictor that generates a chrominance prediction signal which is a prediction signal of a chrominance signal using an intra-frame prediction or an inter-frame prediction;
 a luminance-chrominance predictor that generates a luminance-chrominance prediction signal for predicting the chrominance signal by modifying a signal element of a locally decoded signal of the luminance signal based on a normalization parameter which enables a comparison between an energy of the signal element of the luminance signal and an energy of a signal element of the chrominance signal;
 a combiner that generates a corrected chrominance prediction signal which is the prediction signal of the chrominance signal by combining the chrominance prediction signal and the luminance-chrominance prediction signal; and
 a subtracter that generates a residual signal of the luminance signal by subtracting the luminance prediction signal from the luminance signal, and generates a residual signal of the chrominance signal by subtracting the corrected chrominance prediction signal from the chrominance signal.

2. The encoding device according to claim 1, comprising a rate converter that converts a sampling rate of the luminance signal so as to coincide with a sampling rate of the chrominance signal.

3. A decoding device for processing an image signal, the decoding device comprising:
- a first predictor that generates a luminance prediction signal which is a prediction signal of a luminance signal using an intra-frame prediction or an inter-frame prediction;
- a second predictor that generates a chrominance prediction signal which is a prediction signal of a chrominance signal using an intra-frame prediction or an inter-frame prediction;
- a luminance-chrominance predictor that generates a luminance-chrominance prediction signal for predicting the chrominance signal by modifying a signal element of a locally decoded signal of the luminance signal based on a normalization parameter which enables a comparison between an energy of the signal element of the luminance signal and an energy of a signal element of the chrominance signal;
- a combiner that generates a corrected chrominance prediction signal which is the prediction signal of the chrominance signal by combining the chrominance prediction signal and the luminance-chrominance prediction signal; and
- an adder that generates the luminance signal by adding a residual signal of the luminance signal and the luminance prediction signal, and generates the chrominance signal by adding a residual signal of the chrominance signal and the corrected chrominance prediction signal.

4. The decoding device according to claim 3, comprising a rate converter that converts a sampling rate of the luminance signal so as to coincide with a sampling rate of the chrominance signal.

5. A non-transitory storage medium which stores a program for making a computer configured as an encoding device for processing an image signal, the computer executing:
- a step for generating a luminance prediction signal which is a prediction signal of a luminance signal using an intra-frame prediction or an inter-frame prediction;
- a step for generating a chrominance prediction signal which is a prediction signal of a chrominance signal using an intra-frame prediction or an inter-frame prediction;
- a step for generating a luminance-chrominance prediction signal for predicting the chrominance signal by modifying a signal element of a locally decoded signal of the luminance signal based on a normalization parameter which enables a comparison between an energy of the signal element of the luminance signal and an energy of a signal element of the chrominance signal;
- a step for generating a corrected chrominance prediction signal which is the prediction signal of the chrominance signal by combining the chrominance prediction signal and the luminance-chrominance prediction signal; and
- a step for generating a residual signal of the luminance signal by subtracting the luminance prediction signal from the luminance signal, and generating a residual signal of the chrominance signal by subtracting the corrected chrominance prediction signal from the chrominance signal.

6. A non-transitory storage medium that stores a program for making a computer configured as a decoding device for processing an image signal, the computer executing:
- a step for generating a luminance prediction signal which is a prediction signal of a luminance signal using an intra-frame prediction or an inter-frame prediction;
- a step for generating a chrominance prediction signal which is a prediction signal of a chrominance signal using an intra-frame prediction or an inter-frame prediction;
- a step for generating a luminance-chrominance prediction signal for predicting the chrominance signal by modifying a signal element of a locally decoded signal of the luminance signal based on a normalization parameter which enables a comparison between an energy of the signal element of the luminance signal and an energy of a signal element of the chrominance signal;
- a step for generating a corrected chrominance prediction signal which is the prediction signal of the chrominance signal by combining the chrominance prediction signal and the luminance-chrominance prediction signal; and
- a step for generating the luminance signal by adding a residual signal of the luminance signal and the luminance prediction signal, and generating the chrominance signal by adding a residual signal of the chrominance signal and the corrected chrominance prediction signal.

* * * * *